(12) United States Patent
Rinko

(10) Patent No.: US 11,650,364 B2
(45) Date of Patent: May 16, 2023

(54) LIGHT DISTRIBUTION ELEMENT

(71) Applicant: NITTO DENKO CORPORATION, Osaka (JP)

(72) Inventor: Kari Rinko, Helsinki (FI)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 17/056,934

(22) PCT Filed: May 21, 2019

(86) PCT No.: PCT/IB2019/054173
§ 371 (c)(1),
(2) Date: Nov. 19, 2020

(87) PCT Pub. No.: WO2019/224705
PCT Pub. Date: Nov. 28, 2019

(65) Prior Publication Data
US 2021/0181399 A1    Jun. 17, 2021

Related U.S. Application Data

(60) Provisional application No. 62/674,260, filed on May 21, 2018.

(51) Int. Cl.
*G02B 6/00*    (2006.01)
*F21V 8/00*    (2006.01)

(52) U.S. Cl.
CPC ............ *G02B 6/005* (2013.01); *G02B 6/006* (2013.01); *G02B 6/0036* (2013.01); *G02B 6/0065* (2013.01)

(58) Field of Classification Search
CPC ..... G02B 6/005; G02B 6/0036; G02B 6/0065
See application file for complete search history.

(56) References Cited

U.S. PATENT DOCUMENTS 10,139,550 B2    11/2018    Thompson et al.
2004/0022050 A1   2/2004    Yamashita et al.
(Continued)

FOREIGN PATENT DOCUMENTS

JP    8-62428       3/1996
JP    2002-222604   8/2002
(Continued)

OTHER PUBLICATIONS

English language International Search Report issued in PCT/IB2019/054173, dated Sep. 10, 2019.
English language Written Opinion issued in PCT/IB2019/054173, dated Sep. 10, 2019.
Extended European search report issued in EP Application No. 19 80 7799, dated Dec. 15, 2021.
Chinese Office Action and Search Report received in CN Application No. 201980034041.3, dated Mar. 14, 2022.
(Continued)

*Primary Examiner* — Gerald J Sufleta, II
(74) *Attorney, Agent, or Firm* — Greenblum & Bernstein P.L.C.

(57) ABSTRACT

A controlled light distribution element is provided comprising a lightguide medium configured for light propagation, a first functional layer configured as an optical filter layer and disposed on an at least one surface of the lightguide medium, and a second functional 5layer comprising an at least one optically functional pattern, wherein the first functional layer and the second functional layer are rendered with an at least one optical function related to incident light and, in particular, to light incident at an angle equal and/or below the critical angle.

37 Claims, 9 Drawing Sheets

(56) References Cited

U.S. PATENT DOCUMENTS

| | | | |
|---|---|---|---|
| 2009/0086466 A1 | 4/2009 | Sugita et al. | |
| 2010/0157619 A1* | 6/2010 | Chinniah | G02B 6/001 362/551 |
| 2011/0244187 A1* | 10/2011 | Rinko | B32B 25/08 428/156 |
| 2011/0297220 A1* | 12/2011 | Rinko | B32B 17/06 156/219 |
| 2012/0162281 A1* | 6/2012 | Cho | G02B 6/0036 362/621 |
| 2013/0314943 A1 | 11/2013 | Huang | |
| 2013/0315534 A1 | 11/2013 | Huang et al. | |
| 2014/0140091 A1 | 5/2014 | Vasylyev | |
| 2015/0192728 A1 | 7/2015 | Thompson et al. | |
| 2017/0212295 A1 | 7/2017 | Vasylyev | |
| 2020/0166694 A1 | 5/2020 | Sugino et al. | |

FOREIGN PATENT DOCUMENTS

| | | |
|---|---|---|
| JP | 2002-358811 | 12/2002 |
| JP | 2011-210595 | 10/2011 |
| JP | 2013-159099 | 8/2013 |
| WO | 2019/026865 | 2/2019 |

OTHER PUBLICATIONS

Chinese Office Action received in CN Application No. 201980034041.3, dated Nov. 14, 2022.

Japan Official Action issued in Japanese Patent Application No. 2020-564334, dated Jan. 17, 2023.

* cited by examiner

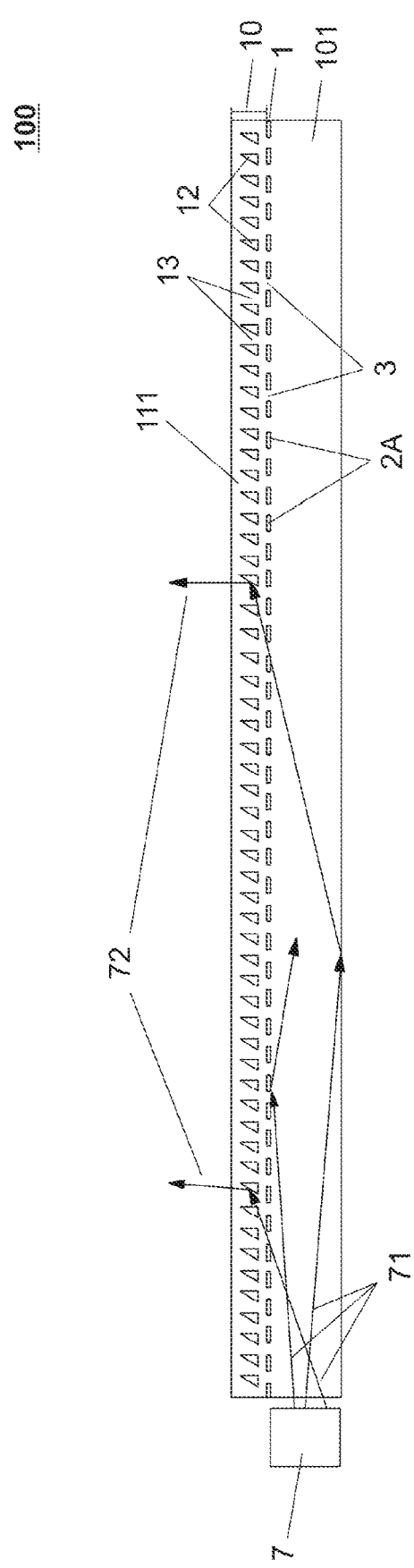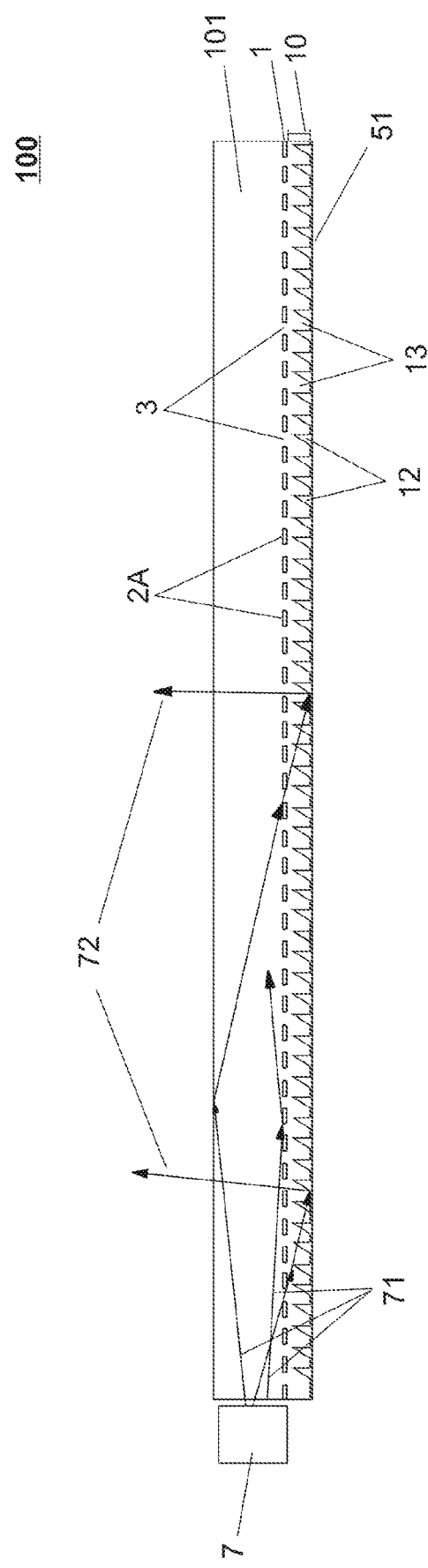

LIGHT DISTRIBUTION ELEMENT

FIELD OF THE INVENTION

Generally, the present invention relates to light-transmissive substrate optics. In particular, the present invention concerns a light distribution element, such as a lightguide, for example, with improved illumination uniformity.

BACKGROUND

Typical light distribution element (e.g. a lightguide element) is based on provision of optical patterns, which control light extraction, outcoupling and uniformity distribution. Additionally, almost all lightguide elements utilize brightness enhancement films provided as separate optical layers, which films/layers operate with already outcoupled light and/or incident light with an angle of incidence exceeding the critical angle, in order to control light distribution angles. Due to provision of separate layers, optical management in the final design is always challenging, and multiple designs need to be completed in order to achieve desired performance.

Illumination systems can be defined for transmissive, lightguide and reflective elements. Basic illumination distribution and uniformity can be controlled with optical structures. Another option is to utilize light reflecting layers, which provide local control over light passing through the layer. Some prior art solutions are based on low refractive index coating or cladding, having the refractive index ($R_i$) values lower than that in surrounding media. Incident light, arriving at angles of incidence larger than the critical angle relative to surface normal, undergoes total internal reflection and does not penetrate through such low $R_i$ layer. Prior art is also teaches the solutions with voids or apertures in a substrate layer or a cladding, in which the refractive index is the same or higher than a surrounding medium, such as a lightguide medium. Those voids or apertures allow light rays to pass through the coating or cladding layer. Such types of layers are based on specific low $R_i$ materials, which require more know-how and advanced processing- and production technologies. In most instances, costs for these materials is a critical factor, which limits utilization thereof in high volume production.

In the U.S. Pat. No. 10,139,550 (Thompson et al) a non-continuous cladding layer is disclosed with discrete voids, wherein another material has been utilized to fill those voids in order to achieve light passages to a second medium. Also the document US 2009/0086466 (Sugita et al) teaches a non-continuous cladding layer with filled voids. The document WO 2019/026865 (Sugino et al) discloses a discreet, non-continuous cladding layer forming a pattern with low $R_i$, in which the refractive index has been modified and managed such, as to form light passages from a first medium to a second medium. All mentioned documents teach low $R_i$ coating- or cladding layers that produce total internal reflection (TIR).

SUMMARY OF THE INVENTION

An objective of the present invention is to at least alleviate each of the problems arising from the limitations and disadvantages of the related art. The objective is achieved by various embodiments of a light distribution element, according to what is defined in the independent claim 1.

In embodiment, a light distribution element is provided, comprising:
a lightguide medium configured for light propagation,
a first functional layer configured as an optical filter layer and disposed on an at least one surface of the lightguide medium, and
a second functional layer comprising an at least one optically functional feature pattern,
wherein the first functional layer and the second functional layer are rendered with an at least one optical function related to incident light and, in particular, to light incident at an angle equal and/or below the critical angle, and
wherein the first functional layer is further configured as an internal layer with a light uniformity control function, and wherein said layer comprises a number of optical contact areas configured to transmit light rays therethrough, optionally, to the second functional layer and from said second functional layer.

The light distribution element (100) of claim 1, wherein the first functional layer (1) is integrated between the second functional layer (10) and the lightguide medium (101).

In said light distribution element, the first functional layer can be configured as a cladding, a coating, or a film.

In said light distribution element, the first functional layer may be rendered with at least a light transmission function.

In embodiment, the first functional layer is at least partly formed of the substrate material having a refractive index substantially equal to or higher than the refractive index of the material constituting the lightguide medium and, optionally, the refractive index of material constituting the second functional layer.

In alternative embodiment, the first functional layer is at least partly formed of a substrate material having the refractive index lower than the refractive index of material constituting the second functional layer and, optionally, lower than the refractive index of material constituting the lightguide medium.

In embodiment, the first functional layer is configured as a total internal reflection (TIR) layer structure.

In embodiment, the optical contact areas are established in said first functional layer by a number of apertures formed in a substrate material. In embodiments, the apertures formed in the substrate material are through-apertures.

In embodiment, said apertures form enclosed voids upon being integrated within the light distribution element. In embodiments, said enclosed voids are filled with gaseous medium, such as air, or with vacuum In embodiment, the first functional element is configured as a substrate material with a number of apertures integrated into a layer of essentially optically transparent material. In embodiments, said essentially optically transparent material is an adhesive material.

In some embodiment, the optical contact areas are established in said first functional layer by a discrete pattern or patterns formed by the substrate material between the apertures.

In embodiment, the optical contact area is provided as any one of: a line, a dot, a geometric shape, a cross, a grid, or as a pattern comprising any combination thereof.

In embodiment, the optical contact areas are arranged into an at least one array within an at least one predetermined location at said first functional layer or into an at least one array extending along and/or across an entire surface of said first functional layer.

In embodiment, the first functional layer comprises at least two sublayers. In embodiments, each said sublayer comprises a number of optical contacts, configured to transmit light rays therethrough, wherein the optical contacts are formed by a plurality of apertures and/or by a discrete pattern or patterns formed by the substrate material between said apertures.

In an aspect, a light distribution element is further provided according to what is defined in the independent claim 19.

In embodiment, the light distribution element comprises:
a lightguide medium configured for light propagation,
a first functional layer configured as an optical filter layer and disposed on an at least one surface of the lightguide medium, and
a second functional layer comprising an at least one optically functional feature pattern,
wherein the first functional layer and the second functional layer are rendered with an at least one optical function related to incident light and, in particular, to light incident at an angle equal and/or below the critical angle, and
wherein the first functional layer is further configured as an internal layer with a light uniformity control function, said layer optionally comprising a number of enclosed voids formed upon integration of the first functional layer within the light distribution element, wherein said voids are filled with a gaseous medium or vacuum.

In embodiment, mentioned voids are filled with air.

In embodiment, the first functional layer is integrated between the second functional layer and the lightguide medium.

In embodiment, the enclosed voids are established by a number of apertures provided in a substrate, upon integration of said substrate with the apertures into the light distribution element.

In embodiment, said first functional layer comprises a plurality of optical contacts, configured to transmit light rays therethrough, optionally, to the second function layer and from the second functional layer. In embodiment, the optical contacts are formed in said first functional layer by a discrete pattern or patterns formed by the substrate material between the apertures.

In an aspect, a light distribution element is provided according to what is defined in the independent claim 32.

In embodiment the light distribution element comprises:
a lightguide medium configured for light propagation,
a first functional layer configured as an optical filter layer and disposed on an at least one surface of the lightguide medium, and
a second functional layer comprising an at least one optically functional feature pattern,
wherein the first functional layer and the second functional layer are rendered with an at least one optical function related to incident light and, in particular, to light incident at an angle equal and/or below the critical angle, and
wherein the first functional layer is further configured as an internal layer with a light uniformity control function.

In embodiment, the first functional layer is provided as a continuous, uniform layer.

In embodiment, the first functional layer is formed, at least partly, by a substrate material.

In embodiment, the first functional layer consists of or comprises an adhesive material, preferably, an optically clear adhesive material.

In embodiment, the first functional layer is formed without the adhesive material.

In embodiment, the first functional layer comprises at least two sublayers, wherein the first sublayer is formed of the substrate material and wherein said second sublayer is formed of the adhesive material.

In embodiment, the lightguide medium further comprises a number of prominent, optically functional relief profiles, optionally integrated with the adhesive material.

In embodiment, the second functional layer is configured as an optically functional layer rendered with at least a light extraction function and a light outcoupling function.

In embodiment, the at least one optically functional feature pattern of the second functional layer is formed in a light-transmitting carrier medium by a plurality of features provided as optically functional cavities. In embodiment, in said at least one optically functional feature pattern, the optically functional cavities are open-top features.

In embodiment, the at least one optically functional feature pattern of the second functional layer is fully integrated and/or embedded within the light-transmitting carrier medium, whereby an embedded feature pattern is established in the light-transmitting carrier medium by a laminate structure formed by an entirely flat, planar layer of the carrier medium arranged against a patterned layer of the carrier medium and a plurality of optically functional internal cavities is formed at an interface between the layers.

In embodiment, the optical function or functions of the second functional layer is/are established by an at least one of the: dimensions, shape, periodicity and disposition of the cavities within the at least one optically functional feature pattern.

In embodiment, the cavities are filled with gaseous medium, such as air.

In embodiment, the at least one optically functional feature pattern comprises a plurality of discrete feature profiles.

In embodiment, the at least one optically functional feature pattern comprises a plurality of at least partly continuous feature profiles provided as a symmetric pattern structure or as an asymmetric pattern structure.

In embodiment, the at least one optically functional feature pattern is a hybrid pattern comprising a plurality of discrete feature profiles or a plurality of at least partly continuous feature profiles.

In embodiment, the optical cavity features are selected from the group consisting of: a groove, a recess, a dot, and a pixel, wherein said cavity features have crosswise profiles selected from: binary-, blazed-, slanted-, prism-, trapezoid-, hemispherical profiles, and the like, and wherein said cavity features have a lengthwise shape selected from: linear, curved, waved, sinusoid, and the like.

In embodiment, the lightguide medium and the second functional layer (10) are an optical polymer and/or glass.

In embodiment, the second functional layer is provided in the form of a laminated multi-layer structure comprising an at least one layer with integrated cavity features and/or a third functional layer, optionally configured as an open profile layer.

In embodiment, the light distribution element further comprises at least one light source, selected from: a Light Emitting Diode (LED), an Organic Light Emitting Diode (OLED), a laser diode, a LED bar, an OLED strip, a microchip LED strip, and a cold cathode tube.

In embodiment, the light distribution element is configured as a light guide, a light pipe, a light-guide film or a light-guide plate.

In another aspect, a process for manufacturing a light distribution element according to any previous embodiment is provided, in accordance to what is defined in the independent claim 58.

In embodiment, the process for manufacturing the light distribution element is provided, wherein the element comprises a lightguide medium configured for light propagation, a first functional layer configured as an optical filter layer with a plurality of discrete apertures formed in a substrate material, said first functional layer being disposed on an at least one surface of the lightguide medium, and a second functional layer, in which method the apertures are produced by an at least one method selected from the group consisting of: laser patterning, direct laser imaging, laser drilling, mask- and maskless laser or electron beam exposure, printing, machining, moulding, imprinting, embossing, micro- and nano-dispensing, dosing, direct writing, discrete laser sintering, and micro-electrical discharge machining (micro EDM).

In embodiment, the first functional layer and/or the second functional layer is/are produced by a roll-to-roll method or a roll-to-sheet method.

In embodiment, the first functional layer is produced on the lightguide medium prior to application of the second functional layer.

In another aspect, an optical device is provided, in accordance to what is defined in the independent claim 61. In embodiment, said optical device is configured as a frontlight illumination device or a backlight illumination device.

In further aspect, use the optical device, according to the previous aspect, is provided, in accordance to what is defined in the independent claim 63.

In still further aspect, a roll of a light distribution element is provided, according to what is defined in the independent claim 64.

In embodiment, the roll of the light distribution element comprises:

a first functional layer configured as an optical filter layer, and a second functional layer comprising an at least one optically functional pattern, wherein the first functional layer is rendered with a light uniformity control function.

In a number of embodiments, the roll the light distribution element is configured to any one of aspects according to the independent claims 1, 19 and 32 and according to embodiments associated therewith.

The utility of the present invention arises from a variety of reasons depending on each particular embodiment thereof. At first, the light distribution element provided hereby has all light management components, such as uniformity control and light extraction with controlled light distribution, integrated in a single element. Two-stage optical management is thus attained, wherein the first function is illumination uniformity control by light filtering. The second function is light extraction and outcoupling at preferred angles.

The inventive concept is based on an optical filter structure for the light distribution element, such as a lightguide, in which optical filter, light incident thereto at an angle exceeding the critical angle, is reflected by total internal reflection (TIR), wherein the phenomenon of TIR primarily produced at a gaseous interface (instead of that produced by the low $R_i$ cladding).

The structure comprises no separate layer components, all "layers" described in the present disclosure are integrated in one element.

In preferred embodiment, in the light distribution element provided hereby the first and the second functions utilize light incident at an angle equal and/or below the critical angle.

This has a major impact for optical pattern design, which differs from that the normal brightness enhancement films.

Novel lightguide element can further utilize a direct outcoupling stack with a light extracting layer on the illumination side, or a function of indirect outcoupling with the light extracting layer on the bottom with a backsheet reflector.

In its broadest sense, the term "light filter" or "optical filter" refers to a device or a material used to change the spectral intensity distribution or the state of polarization of electromagnetic radiation incident thereupon. The filter may be involved in performing a variety of optical functions, selected from: transmission, reflection, absorption, refraction, interference, diffraction, scattering and polarization.

The terms "optical" and "light" are largely utilized as synonyms unless explicitly stated otherwise and refer to electromagnetic radiation within a certain portion of the electromagnetic spectrum, preferably, but not limited to, visible light.

In its broadest sense, the term "optical filter" or a "light filter" refers, in the present disclosure, to a device or a material used to change the spectral intensity distribution or the state of polarization of electromagnetic radiation incident thereupon. The filter may be involved in performing a variety of optical functions, selected from: transmission, reflection, absorption, refraction, interference, diffraction, scattering and polarization.

In its broadest sense, the terms "lightguide" or "waveguide" refer, in the present disclosure, to a device or a structure configured to transmit light therealong (such as from a light source to a light extraction surface). The definition involves any type of the lightguide, including, but not limited to a light pipe type component, a lightguide plate, a lightguide panel, and the like.

The term "carrier" or "carrier medium" generally refers to a flat, planar member composed of a substrate material configured for light propagation and optionally constituting a layered structure.

The term "element" is used in the present disclosure to indicate a part of an entity.

The expression "a number of" refers herein to any positive integer starting from one (1), e.g. to one, two, or three; whereas the expression "a plurality of" refers herein to any positive integer starting from two (2), e.g. to two, three, or four.

The terms "first" and "second" are not intended to denote any order, quantity, or importance, but rather are used to merely distinguish one element from another.

BRIEF DESCRIPTION OF THE DRAWINGS

Different embodiments of the present invention will become apparent by consideration of the detailed description and accompanying drawings, wherein:

FIGS. 1A and 1B are cross-sectional views to show a light distribution element 100 according to some embodiments of the present invention.

DETAILED DESCRIPTION OF THE EMBODIMENTS

Figure 2A:
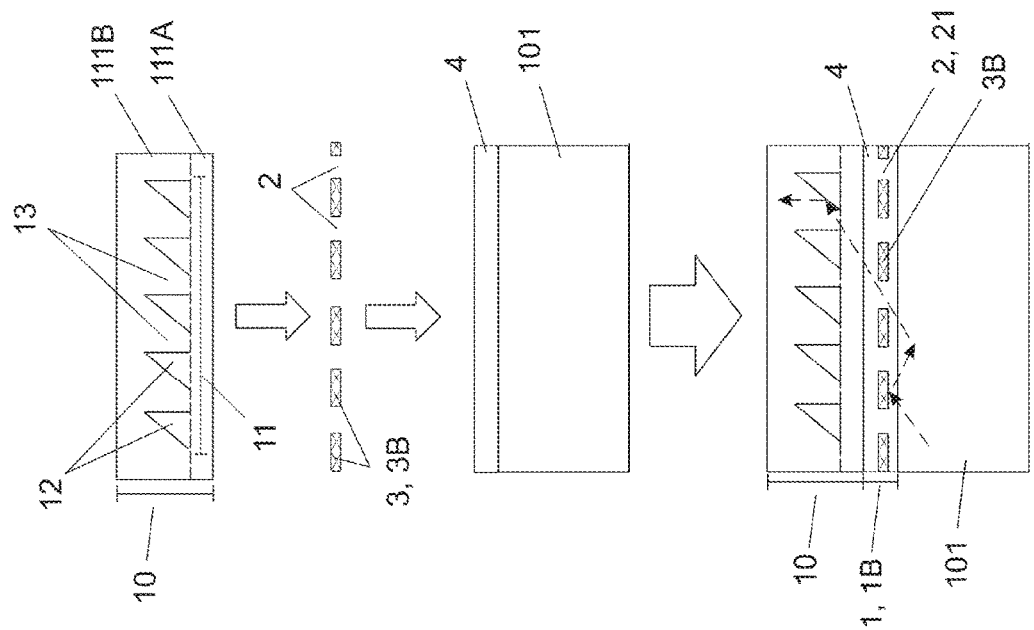
FIGS. 2A-2H schematically illustrate a manufacturing process of the light distribution element and a related film stack, according to various embodiments of the present invention.

Detailed embodiments of the present invention are disclosed herein with the reference to accompanying drawings. The same reference characters are used throughout the drawings to refer to same members. Following citations are used for the members:
100—a light distribution element;
101—an optically transparent substrate (lightguide medium configured for light propagation);
1—a first functional layer (an optical filter);
1-1, 1-2—sublayers (the optical filter);
2—apertures in the first functional layer;
2A—enclosed voids;
3—a substrate;
4—an optically transparent material (an adhesive);
5—a protective cover;
10—a second functional layer;
11—an optical feature pattern;
12—an optical (pattern) feature;
13—a light passage;
20—a third functional layer;
21, 31—optical contacts;
51—a reflector sheet;
7—a light source;
71—incident light;
72—extracted (outcoupled) light;
111, 111A, 111B—a light-transmitting carrier medium;
121—a pattern on the lightguide medium 101;
200—an optical device.

FIGS. 1A and 1B illustrate, at 100, a concept underlying a novel light distribution element or a lightguide with a light distribution filter (LDF). In some instances, the light distribution element 100 is referred to as a "lightguide"

The light distribution element 100 comprises a light-transmitting carrier medium 101 configured for light propagation, such as propagation of incoupled light 71 emitted by a light source 7.

The lightguide medium 101 is preferably optically transparent polymer or glass. In some instances, the lightguide medium is made of polymethylmethacrylate (PMMA) or polycarbonate (PC) materials. The light guide medium can be provided as a substantially planar medium, such as a sheet, a plate, or a film, for example, optionally provided with a number of prominent relief profiles on at least one surface thereof.

The element 100 further comprises at least a first optically functional layer 1 and a second optically functional layer 10, referred to, hereafter, as first functional layer and a second functional layer, or as first- and second layers. Said layers 1 and 10 are each rendered with at least one optical function related to incident light.

The first functional layer 1 is configured as an optical filter layer (a light distribution filter) rendered with a light uniformity control function. In this regard, the first functional layer is further referred to, in some instances, as a "light filter" or an "optical filter".

The first functional layer 1 is disposed on an at least one surface of the lightguide medium 101. It is preferred that the optical filter layer 1 is an internal layer integrated within the element 100. In some configurations, the optical filter layer 1 is integrated between the second functional layer 10 and the lightguide medium 101 (FIGS. 1A, 1B).

Thickness of the optical filter layer 1 is provided within a range of 1-10 micrometers (μm).

In some alternative configurations, provision of an additional layer or layers between the optical filter 1 and the second functional layer 10 and/or between the optical filter 1 and the lightguide medium 101 is not excluded.

The second functional layer 10 is preferably rendered with a light extraction function and/or a light outcoupling function.

In some configurations, the second functional layer 10 comprises at least one optically functional feature pattern 11, as described in more detail further below. By provision of said pattern within the layer 10 and/or by virtue of material said layer 10 is made of, the second functional layer 10 is rendered with the optical function or functions mentioned above, namely, extraction and/or outcoupling of light propagated in and/or through the lightguide element 100.

In a number of configurations, the both functional layers 1, 10 are rendered with a predetermined optical function or functions related to light incident thereto at an angle equal and/or below the critical angle relative to the surface normal.

Critical angle is an incident angle of light relative to the surface normal, at which a phenomenon of the total internal reflection (TIR) occurs. The angle of incidence becomes a critical angle (i.e. equal to the critical angle), when the angle of refraction constitutes 90 degrees relative to the surface normal. Typically, TIR occurs, when light passes from a medium with higher) refractive index ($R_i$) to a medium with low(er) $R_j$, for example, from plastic ($R_i$ 1.4-1.6) or glass ($R_i$ 1.5) to air ($R_i$ 1) or to any other media with essentially low refractive indices. For a light ray travelling from the high $R_i$ medium to the low $R_i$ medium, if the angle of incidence (at a glass-air interface, for example) is greater than the critical angle, then the medium boundary acts as a very good mirror and light will be reflected (back to the high $R_i$ medium, such as glass). When TIR occurs, there is no transmission of energy through the boundary. From the other hand, light incident at angle(s) less than the critical angle, will be partly refracted out of the high $R_i$ medium and partly reflected. The reflected vs refracted light ratio largely depends on the angles of incidence and the refraction indices of the media.

Critical angle is calculated in accordance with equation (1):

$$\theta_c = \theta_i = \arcsin\left(\frac{n_2}{n_1}\right) \qquad (1)$$

It should be noted that critical angle varies with a substrate-air interface (e.g. plastic-air, glass-air, etc.). For example, for most plastics and glass critical angle constitutes about 42 degree. Thus, in an exemplary waveguide, light incident at a boundary between a light-transmitting medium, such as a PMMA sheet, and air at an angle of 45 degree (relative to the surface normal), will be probably reflected back to the lightguide medium, thereby, no light outcoupling will occur.

In embodiments, the first functional layer 1 is thus configured as a total internal reflection (TIR) layer structure, in which the phenomenon of TIR is established by means various techniques and structures, as further described herein below.

Figure 2B:
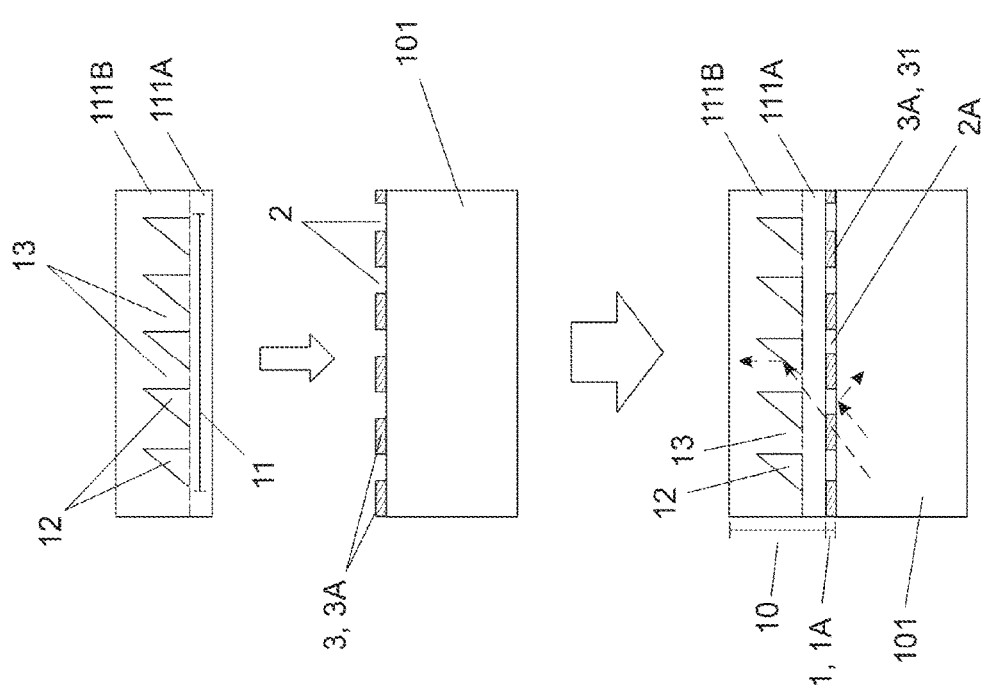
Figure 2D:
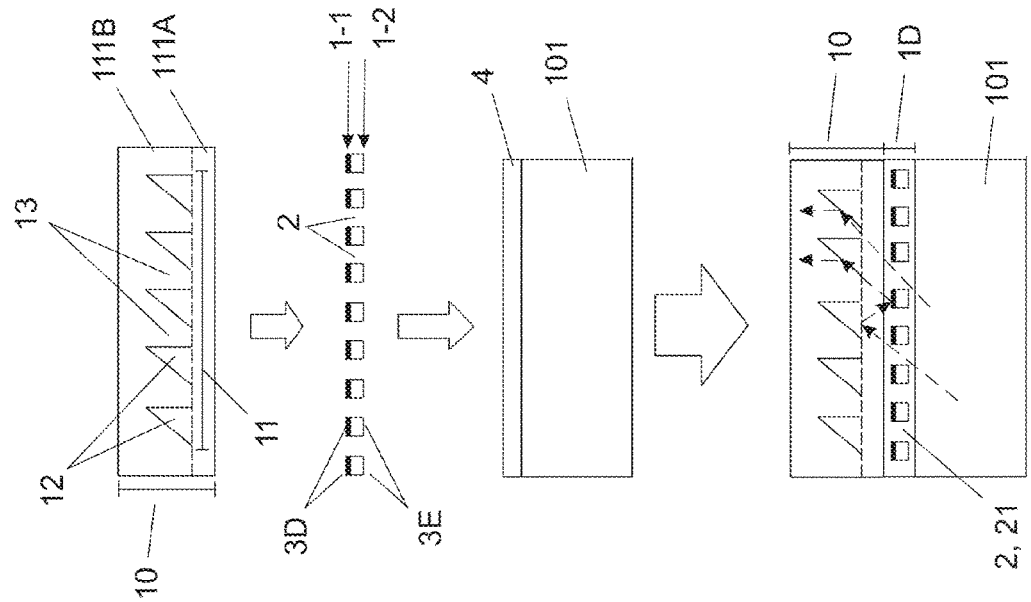
Figure 2C:
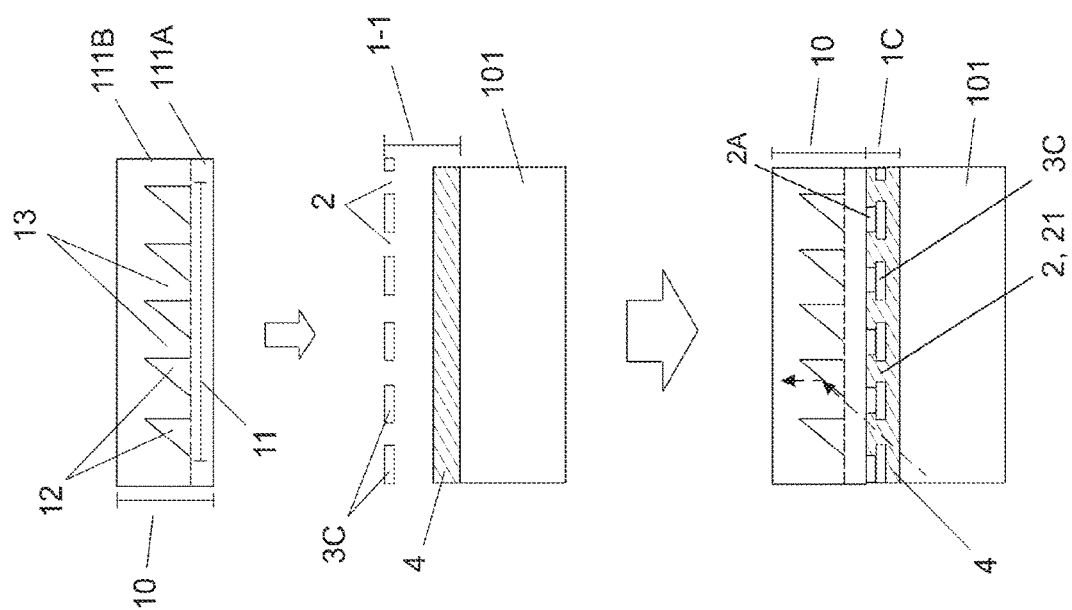
Figure 2F:
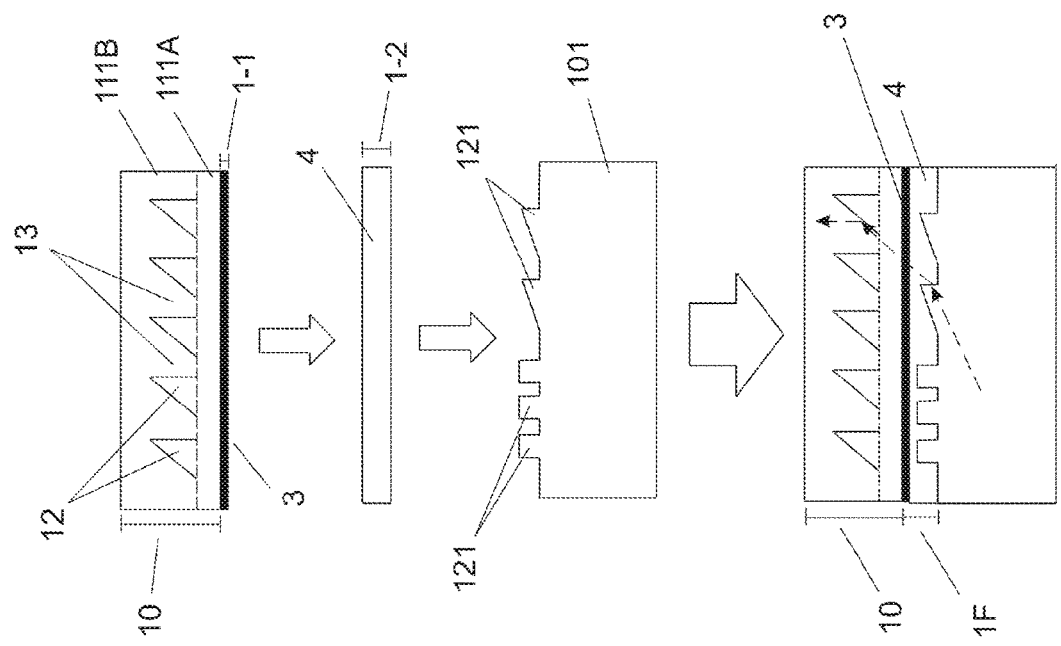
Figure 2E:
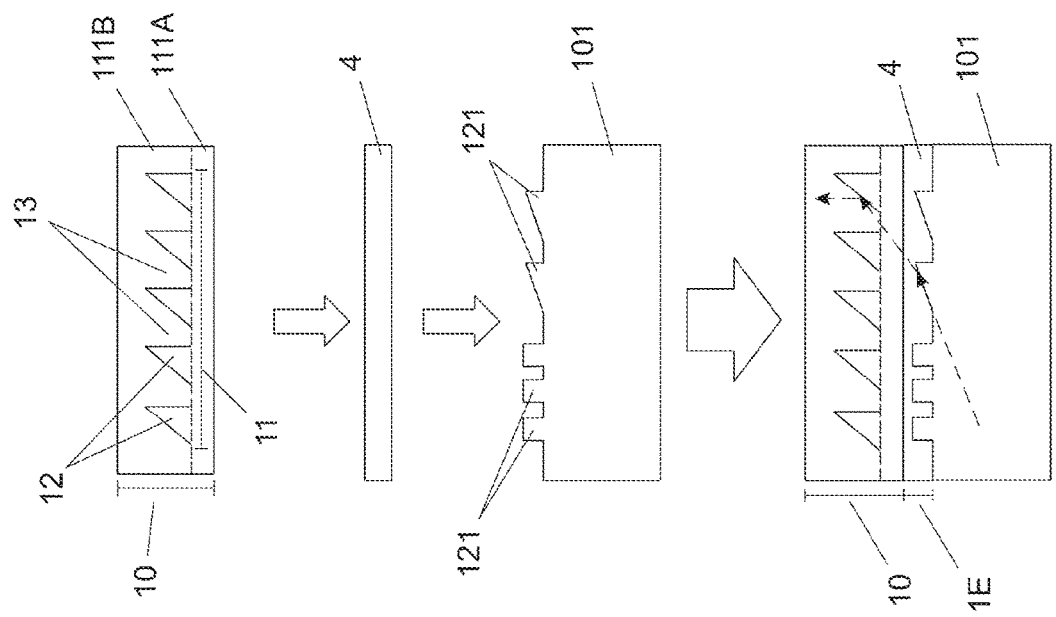
Figure 2H:
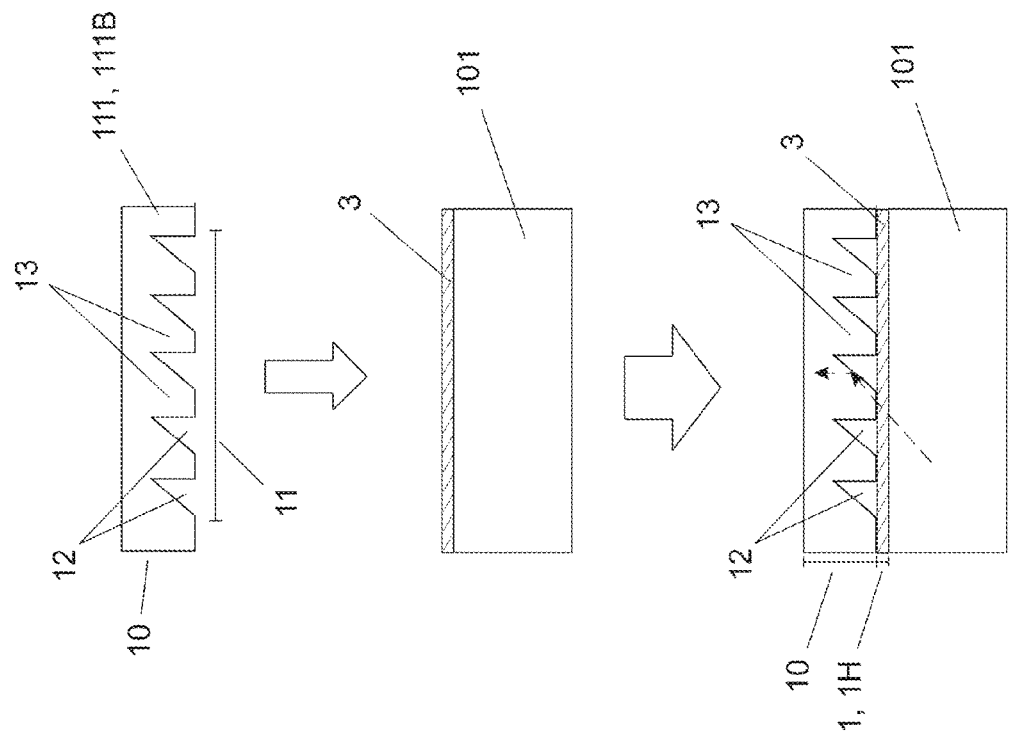
Figure 2G:
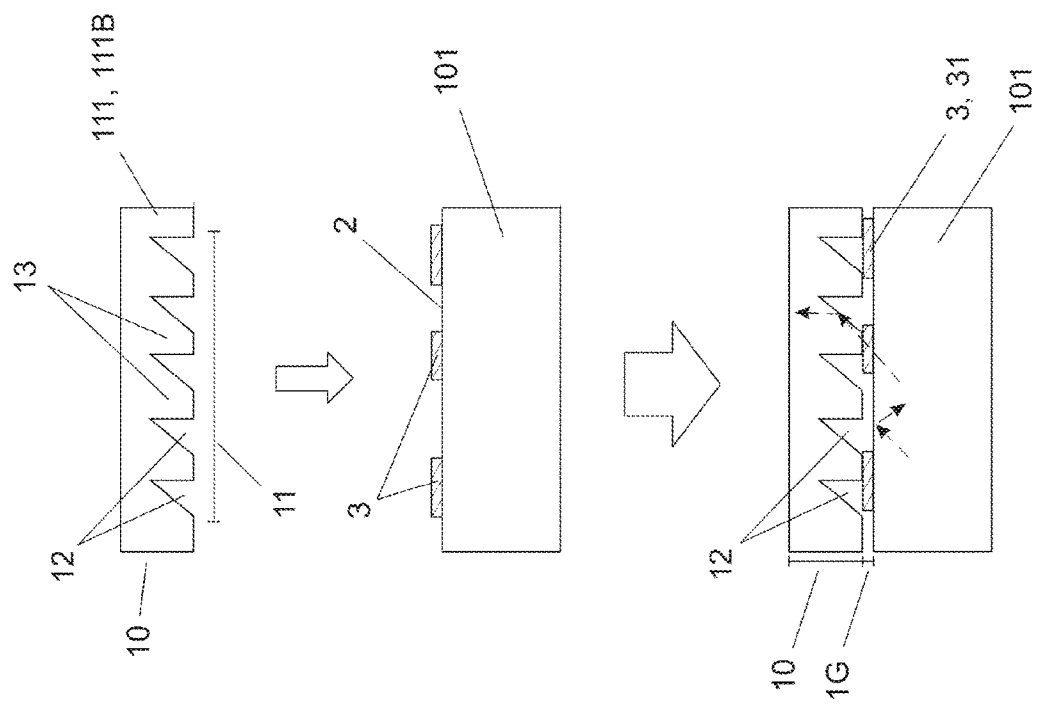

The first functional layer 1 comprises or consists or a substrate material 3 (see FIGS. 2A, 2G, 2H). The first layer 1 is advantageously configured as a substantially planar substrate, formed by a cladding, a coating, a film or a sheet. Said substrate 3 is preferably provided in solid or solidified from, as being applicable by printing, patterning, embossing, and the like, as described further below. Dependent on configuration, the substrate 3 is rendered with light transmissive or light reflective function.

Additionally or alternatively, the first functional layer 1 can comprise an adhesive material 4 (see FIGS. 2B-2F). The adhesive 4 is preferably an optically clear adhesive (OCA) or a liquid optically clear adhesive (LOCA). The adhesive can be a low-viscosity, essentially liquid adhesive or a high-viscosity adhesive, such as essentially gel-type or harder.

Hence, a number of embodiments can be established, wherein the substrate material 3 is at least partly integrated into the adhesive material 4 (see FIGS. 2B-2D); wherein the substrate material 3 and the adhesive 4 form a layered structure or a stack (see FIGS. 2D, 2F); and wherein the light filter layer 1 is established, at least partly, by the (adhesive) material 4 (see FIG. 2E). In a latter event, one may consider the adhesive material 4 replacing the substrate material 3.

By virtue of materials it is made of, the substrate 3, can be rendered with refractive index value substantially equal to or higher than the refractive indices of the surrounding layers or, alternatively, lower, than the refractive indices of said surround layers (viz. refractive indices of the lightguide medium 101 and/or the second functional layer 10).

Hence, in some configurations, the first functional layer 1 is at least partly formed of the substrate material 3 having the refractive index substantially equal to or higher than the refractive index of the material constituting the lightguide medium 101 and, optionally, the refractive index of material constituting the second functional layer 10.

In some alternative configurations, the first functional layer 1 is at least partly formed of the substrate material 3 having the refractive index lower than the refractive index of material constituting the second functional layer 10 and, optionally, lower than the refractive index of material constituting the lightguide medium 101 (see description to FIG. 2F).

What is typically referred to as "low refractive index" is the refractive index value provided within a range of 1-1.4.

In a number of configurations, the first functional layer 1 is provided as a substantially planar, continuous, uniform layer (see FIG. 2H, for example). In some additional or alternative configurations, it is preferred that said first functional layer 1 comprises a plurality of discrete apertures 2, formed in the substrate material 3.

In terms of general implementation, the light distribution element 100 employs provision of a number of so called optical channels established in the element 100 to enable controlled light propagation through the light transmitting medium. As a general remark, in the context of the optical channel related concept, by the expression "light transmitting medium" we refer to any media capable of propagating light therethrough (i.e. not preventing light from propagating therethrough). As shown on FIGS. 1A and 1B, the optical channel, or a pathway for effective and controlled propagation of light rays emitted by the light source 7 (rays 71) to a display surface, for example (rays 72), is established, in the element 100, by the light transmitting media and/or the light transmitting optical structures comprising the light transmitting media provided within the components forming the element 100, namely, the within the functional layers 1 and 10, and within the basic lightguide medium 101

To implement the optical channel concept discussed above, the first functional layer 1 thus comprises a number of optical contact areas 31, 41 (FIGS. 2A-2H), referred to, hereafter, as "optical contacts" and configured to transmit light rays therethrough.

In some configurations, the optical contact area can be established across the entire surface laid with the first functional layer 1 and represented by the substrate 3 (see FIGS. 2F, 2H) and/or by the adhesive 4 (see FIGS. 2E, 2F). In some configurations, the optical contacts are provided as substantially discrete regions established, as described with reference to FIGS. 2A-2D and 2G.

Implementation of the optical contacts 21, 31 can be such, as to enable controlled propagation of light rays to the second functional layer 10 and from said second functional layer 10.

The optical filter layer 1 disposed between the patterned (11) second functional layer 10 and the lightguide substrate 101 accounts for enhanced uniformity of light passing therethrough. Enhanced uniformity is achieved by a thorough selection of materials said optical filter layer is made of and, optionally, provision of apertures 2 and/or filling materials for these apertures.

By virtue of materials the optical filter layer 1 is fabricated of and/or by provision of the apertures 2 therein, said optical filter layer 1 is configured control light incident thereto at angles of incidence equal and/or below the critical angle relative to the surface normal (at an interface between the media). For the second functional layer 10, referred to, in some instances, as an "air-cavity light extraction layer", this function is enabled by provision of the optically functional pattern structures, as described further below.

A number of configurations for the light distribution element 100 and methods for assembling a layered structure shall be described next with the reference to FIGS. 2A-2H. Direction of light propagation is indicated by dashed lines. As a disclaimer, we note hereby, that these indications are intended to merely illustrate the manner of light propagation through the element 100 within the concept of optical contacts and optical channels disclosed hereby, and, therefore, should not be interpreted in a sense of strict compliance with the laws of physics.

Reference is further made to FIGS. 2A and 2B describing, within the inventive concept, two basic configurations for formation of optical contacts in the first functional layer 1.

As mentioned above, the substrate 3 that forms said first functional layer 1 can be provided with apertures 2. In some configurations, the apertures 2 are through-apertures that extend through an entire width thereof, as from an overlaying layer (hereby, the second functional layer 10) to an underlying layer (hereby, the lightguide medium 101).

By virtue of mentioned apertures 2, a number of enclosed voids 2A is formed upon integration of said first functional 1 layer 1 within the light distribution element 100 (FIG. 1A).

In some configurations, said enclosed voids 2A are filled with gaseous medium, such as air, nitrogen, oxygen, argon, etc., or vacuum.

Enclosed voids 2A configured as air-voids ("air-traps") formed hereby prevent light from passing therethrough due to the phenomenon of TIR. Optical contacts 31 are hereby established by the substrate 3 (embodied at 3A) fabricated from material enabling light propagation therethrough. In the exemplary configuration shown on FIG. 2A the substrate 3 is represented by a plurality of bonding dots 3A, such as printed bonding dots, for example, that dots act as optical contacts 31 for enabling light transmission to the light extraction layer 10 and for providing optical bonding strength with the mentioned layer 10. In this regard, the light distribution element 100 shown on FIG. 2A is a fully laminated and integrated, in terms of light propagation, element comprising: 1) the lightguide medium 101, configured, for example, as a basic PMMA lightguide or other light transparent material without any light extraction pattern; 2) the first functional layer 1, embodied at 1A, with enclosed voids 2A, such as air-voids, alternating with optical contacts 31 formed by the light-transmissive substrate 3A (provided as printed dots, for example); and 3) the second functional layer 2 configured as the light extracting layer 10 with an air-cavity pattern for efficient and controlled light distribution.

It should be mentioned that the refractive index of air filling the enclosed voids 2A, is generally lower than the refractive index of the material constituting the lightguide medium 101, and optionally, the refractive indices constituting the media of the layer components 1 and 10.

FIG. 2A thus describes a basic configuration, in which the optical contacts 31 are formed by substrate material 3 (hereby, 3A).

In the lightguide element 100 disclosed hereby, light uniformity control is implemented utilizing internal and integrated optical filter 1 based on a concept of optical channels or optical contacts described hereinabove, in particular, with regard to light having particular angles of incidence. Mentioned optical contacts are realized by a plurality of ways, including, but not limited to apertures and light filtering, provision of air-voids, provision of a low $R_i$ layer, and/or provision of a reflector layer (configured to attain diffusing, Lambertian, or specular reflection) of a desired color.

Printed dots, such as shown on FIG. 2A and also on FIG. 2G, represent a simplest approach for controlling uniformity and transmitting a desired range (in terms of angle of incidence, for example) of light into the light extraction layer 10. Printed dots do not bear any optical functionality, as light passing therethrough does not undergo extraction (via refraction, reflection, collimation, and the like); instead, said printed dots form optical passages (optical contacts) for light rays to propagate from the first functional layer 1 and/or the underlying lightguide medium 101 to the section function layer (light extraction layer) 10.

In terms of size, the printed dots can be provided within a range of e.g. 5 micrometers up to hundreds of micrometers, depending on a particular application and design of the element 100. Height of the dot is defined by the thickness of the optical filter layer 1 and it is preferably not too high (within 1-10 micrometers, for example) in order to avoid any optical extraction. Typically, dots can be printed by inkjet, flexo-, gravure, imprinting, mask or stencil printing, silk printing, and the like.

As shown on FIG. 2A, an area, within the light filter layer 1, without optical dots and channels has a thin airgap (air-voids 2A), which acts as a reflector and prevents undesired light from propagation therethrough. This is an easy and cost-effective alternative, as compared to applying special coating materials, such as low $R_i$ coatings, for example.

Typical application area for the solution described above is display backlight- and/or illumination panels. Due to provision of airgaps, the solution of FIG. 2A is the most appropriate for applications that do not require full transparency.

FIG. 2B describes another basic embodiment, in which the optical contacts 21 can be viewed as being established in the first functional layer 1 by a number of apertures 2 formed in a substrate material 3. The substrate 3 (embodied at 3B) shown on FIG. 3B is a reflective film with apertures 2. The reflective film can be rendered to provide specular or diffusive reflection; naturally, the substrate 3B reflects light arriving thereat. Apertures for such a reflective film can be produced by fast laser drilling process, for example.

In order to create optical contacts 21, the reflective film 3B has been integrated into an optically transparent adhesive 4 (OCA, LOCA, etc.). The adhesive 4 can be liquid, low-viscosity adhesive or a gel-type adhesive material. The first functional layer 1 (embodied at 1B) thus comprises the reflective substrate 3, 3B integrated into the optically transparent adhesive 4. Upon integration into adhesive 4, the apertures 2 in the substrate 3B become "filled" with the optically clear material, thus forming optical contacts 21. In configuration shown on FIG. 2B the voids 2A are not formed; instead, the optical filter layer 1 is laminated by means of an adhesive 4.

FIG. 2B shows that, upon formation of the first functional layer 1, the reflective film 3B is enclosed into the adhesive 4 such, that an interface is formed between the adhesive 4 and the structures 101 and 10. In alternative configurations, the adhesive 4 can be applied such as to fill up the voids (apertures 2) within the substrate 3, 3B such that the reflective surfaces 3B shall be deposited at the interface between the structures 101 and 10.

In any event, the first functional layer 1 (embodied at 1B), is fully laminated between the two main layers 101, 10 such, as to provide controlled uniform light. Optical adhesive has preferably refractive index equal or higher than that of the lightguide material 101 and, optionally, than that of the light extraction layer 10.

The light distribution element 100 shown on FIG. 2B is a fully laminated and integrated element comprising: 1) the lightguide medium 101, configured, for example, as the basic PMMA lightguide or other light transparent material without any light extraction pattern; 2) the first functional layer 1, embodied at 1B, comprising the reflective substrate 3B with apertures 2 integrated or filled by a low-viscosity- or gel-type optical adhesive material 4 to form optical contacts 21; and 3) the second functional layer 2 configured as the light extracting layer 10 with an air-cavity pattern for efficient and controlled light distribution.

In embodiments, the optical contact 21, 31 can be provided as any one of: a line, a dot, a geometric shape, a cross, a grid, or as a pattern comprising any combination thereof.

The optical contacts 21, 31 can be arranged into an at least one array within an at least one predetermined location at said first functional layer 1 or into an at least one array extending along and/or across an entire surface of said first functional layer 1.

Figure 6:
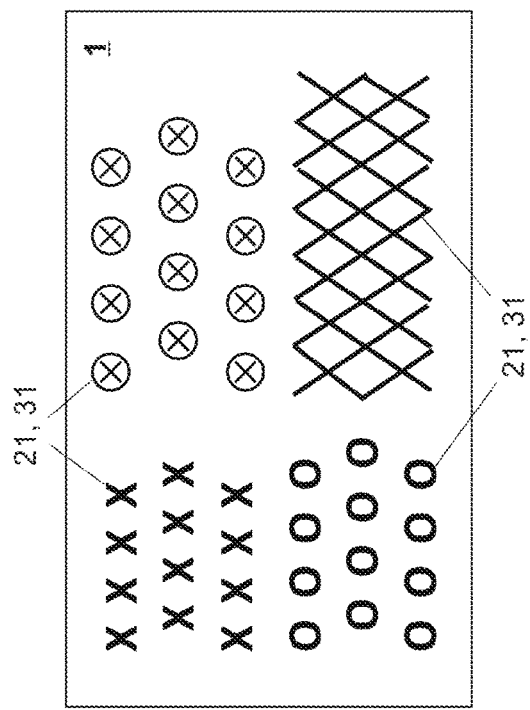
FIG. 6 shows a number of exemplary optical contact patterns for a first functional layer of the light distribution element.

FIG. 6 illustrates exemplary configurations for the optical contacts 21, 31. The optical contacts can be implemented according to any basic embodiment described for FIGS. 2A and 2B, with the optical contacts established by a substrate material 2 (optical contacts 31) or by an optically clear adhesive material within the apertures 2 (optical contacts 21).

Whether the optical contacts are embodied, at 31, as light transmitting printed patterns 3A (according to FIG. 2A) or as optically clear adhesive patterns 21 provided between the reflective structure 3B (according to FIG. 2B), density, size and coverage for each said optical contact pattern 21, 31 can vary in order to achieve desired mode for light propagation and to attain enhanced control over said light propagation.

FIG. 2C illustrates a configuration, in which the first functional element 1 comprises a number of enclosed voids 2A, such as air-voids, for example, formed in the adhesive material 4. The configuration is assembled as follows. A substrate film 3, embodied at 3C, configured as an essentially (optically) transparent film is obtained and integrated into the adhesive 4 in a manner discussed previously with reference to FIG. 2B. The substrate 3C preferably has the refractive index same or similar to that of the underlying lightguide medium 101 and the adhesive material 4. Apart from the implementation shown on FIG. 3B and utilizing a liquid, low-viscosity adhesive or a gel-type adhesive, the adhesive 4 for FIG. 2C is preferably a high-viscosity adhesive. The adhesive 4 penetrates through the apertures 2, e.g. the laser drilled apertures, and forms an optical bonding with the light extraction layer 10 (and the underlaying lightguide medium 101). High-viscosity adhesive 4 can be further patterned by any appropriate method to form the air traps 2A. The optical contacts 21 are formed by provision of the apertures 2 integrated into the high-viscosity adhesive 4.

The light distribution element 100 shown on FIG. 2C is a fully laminated and integrated element comprising: 1) the lightguide medium 101; 2) the first functional layer 1, embodied at 1C, and comprising the first functional element 1 configured as an optically transparent film with aperture design laminated with high-viscosity- or gel-type optical adhesive material between the lightguide medium 101 and the extracting film 10 forming air traps 2A for optical uniformity control, and 3) the light extracting layer 10 with an air-cavity pattern for efficient and controlled light distribution.

We further specify that the apertures 2 generally formed in the substrate layer 3 can act, in some embodiments, as optical contacts 21 (e.g. FIG. 2B) and, in some alternative embodiments, as TIR-functional parts. Configurations, in which the apertures form TIR-functional parts, are illustrated by FIG. 2A and FIG. 2C.

In embodiments, the first functional layer 1 can be configured to comprise at least two sublayers 1-1, 1-2. Provision of such essentially multilayer structure is illustrated by configurations shown on FIGS. 2D and 2F.

FIG. 2D illustrates configuration, in which the optical filter layer provided as a multilayer structure (a stack) with apertures 2. Mentioned stack comprises at least two sublayers 1-1, 1-2 with the apertures 2 that pierce through all said sublayers. In configuration shown on FIG. 2D, the stack structure is formed by a plastic sheet, such as a PMMA sheet (3E, sublayer 1-2) laminated, at least on one side, with a low $R_i$ film (3D, sublayer 1-1). Similarly to the configuration of FIG. 2B, the layered structure with apertures shown on FIG. 2D is integrated into the adhesive 4 provided as liquid, low-viscosity- or gel-type adhesive to form the first functional layer 1 (embodied at 1D).

Hence, the first functional layer 1 may comprise a sublayer 3D (FIG. 2D) formed by a material having the refractive index lower than the refractive index of the material constituting the lightguide medium 101 and, optionally, than the refractive index of material forming the second functional layer 10.

In some instances, provision of the sublayer 3E can be omitted and the first functional layer structure 1D can be formed from a single (sub)layer 3D provided as a low $R_i$ film with apertures (not shown).

Overall, the solution of FIG. 2D is similar to that shown on FIG. 2B, but the optical filter film 1 is a made, at least partly, of a transparent, low $R_i$ material.

The light distribution element 100 shown on FIG. 2D is a fully laminated and integrated element comprising: 1) the lightguide medium 101; 2) the first functional layer 1, embodied at 1D, and comprising the low $R_i$ film 3D optionally provided on a sublayer 3E (PMMA film) with aperture design laminated with the low-viscosity- or gel-type optical adhesive 4 between the lightguide medium and the light extracting film, and 3) the light extracting layer 10 with an air-cavity pattern for efficient and controlled light distribution. FIG. 2E shows a configuration, in which the first functional layer 1 (embodied at 1E) is represented by a layer of adhesive 4, preferably, having the refractive index $R_i$ lower than that of the lightguide medium 101. Additionally, the lightguide medium 101 can be provided with a number of prominent, optically functional relief profiles 121 that can be further integrated with said adhesive material 4. The pattern or patterns 121 are preferably rendered with light refraction functionality; however, without light outcoupling (extraction). In configuration shown on FIG. 2E the optical filter layer 1 is thus established by a substantially low $R_i$ adhesive material 4, optionally combined with a number of relief pattern profiles 121.

The pattern(s) 121 provided in the lightguide medium 101 is a simple formation, which does not extract light out of the light distribution element 100, when laminated. This pattern just refracts- and controls the uniformity of incident light for the next extraction layer 10. The configuration shown on FIG. 2E may utilize a conventional patterned lightguide, which is fully laminated together with light extraction layer 19. This concept also utilizes incident light, which is equal or below the critical angle.

The light distribution element 100 shown on FIG. 2E is a fully laminated and integrated element comprising: 1) the lightguide medium 101 provided as the basic PC lightguide or other light transparent material with some light refracting pattern (no light outcoupling), 2) the optical filter with a lamination adhesive (laminating the lightguide medium and the extracting film), having slightly lower $R_i$ value than the lightguide medium material, and 3) the light extracting layer with an air-cavity pattern for efficient and controlled light distribution.

FIG. 2F illustrates the light distribution element 100 similar to that shown on FIG. 2E. In comparison to the optical filter structure shown on FIG. 2E, the optical filter structure (the first functional layer 1) of FIG. 2F additionally comprises the substrate 3 made of the material with low refractive index. Said substrate 3 can be provided in the form of a low $R_i$ coating, for example, arranged next to the light extraction layer 10. The low $R_i$ value can be optimized for the pattern solution of said light extraction layer 10, in order to control, which light is extracted out.

Similarly to the optical filter structure 1 shown on FIG. 2D, the optical filter structure of FIG. 2F can be considered as a stack solution, wherein the first sublayer 1-1 is the low $R_i$ coating, whereas the adhesive and, optionally, the lightguide pattern 121, constitute the second sublayer 1-2. The substrate 3 of FIG. 2F can be made of same or similar low $R_i$ material as the sublayer 3D (FIG. 2D), for example.

FIG. 2G illustrates the configuration similar to that shown on FIG. 2A, but implemented with the second functional layer 10 comprising open-top pattern features. The first functional layer 1, implemented at 1G, comprises the substrate 3, implemented as a plurality of printed dots. The optical contacts 31 between the lightguide medium 101 and the light extraction layer 10 are established by said printed dots 3. The substrate (printed dots) 3 preferably has refractive index equal to that of the light guide medium 101. In addition to forming the optical channels, the printed dots 3 serve for laminating the first functional layer 1 to the second functional layer 10 with the open-top light extraction pattern. Additionally, via the substrate 3, forming the optical channels, light is further directed to the (upper) layer 10 for final light extraction. Additionally, a number of apertures is formed between the printed dots established by the substrate 3 (in the first functional layer 1G).

The light distribution element 100 shown on FIG. 2G is a fully laminated and integrated element comprising: 1) the lightguide medium 101 provided as the basic PMMA lightguide or other light transparent material without any light extraction pattern, 2) a plurality of printed dots between the lightguide medium and the light extraction film 10, which dots form a physical bonding and, additionally, an optical channel for light uniformity control; and 3) the light extracting layer 10 with an open optical pattern for efficient and controlled light distribution.

Optical dots formed from the substrate 3 (FIG. 2G) do not penetrate inside the open extraction pattern of the second functional layer 10. Optical dots merely form an optical contact and provide bonding strength between the lightguide 101 and the light extraction layer 10.

It should be noted, that on the contrary to the configuration shown on FIG. 2A, for example, the configuration of FIG. 2G does not involve formation of enclosed voids (air-traps). Hence, the apertures formed in the substrate layer 3 (of the first functional layer 1G) connect with a number of optically functional cavities 12 (e.g. air-cavities) defined in the second functional layer 10 with the open optical pattern. The printed dots 3 that form the optical contacts for the first functional layer 1G connect, in turn, with a substantially light transmissive material the second functional layer 10 is made of and establish "optical channels" throughout an entire height and, optionally, width of the light distribution element 100. In the embodiment of FIG. 2G, the apertures formed in the first functional layer 1G can be referred to as "non-enclosed voids" (as being connectable to the air-cavities 12), when said apertures become integrated between the layers 10 and 101.

FIG. 2H shows further configuration for the light distribution element 100, in which the first functional layer 1 is embodied in similar manner as shown on FIG. 2G, but in an absence of apertures 2. Provision of the substrate 3 is such, as cover an entire area across the lightguide medium 101 and to form an optical bonding between said lightguide 101 and the light extraction layer 10. The substrate 3 shown on FIG. 2H can be considered as an optical contact arranged across an entire surface of the lightguide medium 101.

The optical filter layer 1 can be configured as a transparent, low refractive index filter layer or as reflective TIR layer (e.g. diffusive or specular TIR layer) formed on the at least one side of the optically transparent (lightguide) substrate 101. Said optical filter can be: a) applied directly on a flat surface, b) laminated by an adhesive layer, or c) bonded by chemical surface treatment such as VUV (vacuum UV), atmospheric plasma treatment or microwave assisted bonding.

In some instances, the light filter layer 1 has gradually variable low $R_i$ values to provide preferred light distribution even in an absence of apertures.

The apertures within the light filter layer 1 can be optically modulated, whereby a variety of light distribution patterns produced by the light filter layer can be attained, including, but not limited to: uniform, symmetric, discrete, or asymmetric light distribution patterns.

Light distribution by the optical apertures forming a predetermined figure (an image) or a signal, for example, such as on a display, a signage or a poster (see FIG. 4), can be uniform, non-uniform or discrete. Thereby, uniform, non-uniform or discrete figure (image) or signal can be formed. Apertures can be provided on both sides of the optical filter layer forming uniform/continuous or discrete areas. The apertures can be provided throughout the entire surface of the optical filter layer or at predetermined areas thereof.

The principal function of apertures is to control the amount of incident light propagating from the first medium to the second medium without light outcoupling, meaning all incident light angle is larger or the same as the critical angle in the medium. Especially, light uniformity control can thus be achieved without optical pattern.

The apertures can be provided as optical apertures (optical contacts) with a number of primary functions, such as transmitting light therethrough from the first medium to the second medium, which determines desired light distribution and/or uniformity. Light distribution in the first and second medium typically has an incident light angle below the critical angle (an angle of incidence above which TIR occurs) with regard to the medium interface, when air or low $R_i$ filter/-cladding are forming the interface. As a result, light is not outcoupled from the medium.

In addition of being provided as optical apertures (optical contacts), mentioned apertures can establish, in some embodiments, TIR functional parts (as shown on FIGS. 2A, 2C). The apertures can be manufactured by means of laser ablation, short pulse system, plasma etching, mask assisted excimer exposure, micro-printing and/or any other suitable method. For example, laser ablation can be performed utilizing roll-to-roll equipment and methods, wherein the production process may speed up to 40 meters per minute.

Optical apertures can be fabricated by a variety of methods, including, but not limited to: laser patterning, direct laser imaging, laser drilling, mask and/or maskless laser or electron beam exposure, modifying optical material/$R_i$ value by applying discrete proper-ties by printing, inkjet printing, screen printing, micro-/nano dispensing, dosing, direct "writing", discrete laser sintering, micro electrical discharge machining (micro EDM), micro machining, micro moulding, -imprinting, -embossing, and the like. Formation of optical apertures can be completed upon a direct contact with the low $R_i$ cladding or a reflective TIR cladding.

In the light distribution element 100 the optical filter layer 1 (the first functional element) and the light extraction layer 10 (the second functional element) can be produced by roll-to-roll- or roll-to-sheet methods.

It is preferred, that the first functional element 1 is produced on the lightguide medium 101 prior to the second functional element 10.

Additionally, aperture formation can be completed upon an indirect contact, such as operating through the carrier substrate or a lightguide element (medium), e.g. by means of laser ablation, thereby the cladding is removed by ablation, thus forming a desired aperture feature in terms of size and shape in the same manner as by means of the direct contact method. Laser beam spot profile is preferably shaped as a flat top-hat, which does not produce excessive heat and does not damage the carrier substrate or the lightguide medium element, accordingly. Laser wavelength can be selected in terms of cladding absorption curve, hole edge quality, beam shaper optics, thickness/height, operation costs, and the like.

The light distribution element 100 further comprises the second functional layer 10, preferably rendered with a light extraction function and a light outcoupling function.

The second functional layer 10 comprises at least one optically functional feature pattern 11 formed in a light-transmitting carrier medium 111 by a plurality of features provided as optically functional cavities 12. Mentioned In some configurations (FIGS. 2G, 2H), said at least one optically functional feature pattern 11 comprises the optically functional cavities 12 configured as open-top features.

In some configurations (FIGS. 2A-2F), the at least one optically functional feature pattern 11 is fully integrated and/or embedded within the light-transmitting carrier medium 111, whereby an embedded feature pattern is established in the light-transmitting carrier medium by a laminate structure formed by an entirely flat, planar layer 111A of the carrier medium 111 arranged against a patterned layer 111B of the carrier medium 111 and a plurality of optically functional internal cavities 12 is formed at an interface between the layers 111A, 111B.

The optical cavity features 12 can be selected from the group consisting of: a groove, a recess, a dot, and a pixel, wherein said cavity features 12 have crosswise profiles selected from: binary-, blazed-, slanted-, prism-, trapezoid-, hemispherical profiles, and the like, and wherein said cavity features have a lengthwise shape selected from: linear, curved, waved, sinusoid, and the like.

In preferred embodiments, the cavities 12 are filled with air. In some other embodiments, the cavities can be filled with another gas, fluid, liquid, gel, or solid media.

The optically functional pattern 11 can comprise a plurality of discrete profiles or a plurality of at least partly continuous profiles provided as a symmetric pattern structure or as an asymmetric pattern structure.

In some instances, the optically functional pattern can be provided as a hybrid pattern comprising a plurality of discrete profiles or a plurality of at least partly continuous profiles.

Said at least one optically functional pattern can be established by the relief forms selected from the group consisting of: a groove, a recess, a dot, and a pixel, wherein said relief forms have crosswise concave or convex profiles selected from: binary, blazed, slanted, prism, trapezoid, hemispherical, and the like, and wherein said relief forms have lengthwise shape selected from: linear, curved, waved, sinusoid, and the like.

In preferred embodiments, the at least one optically functional pattern is fully integrated and/or embedded within said light distribution element.

Figure 3:
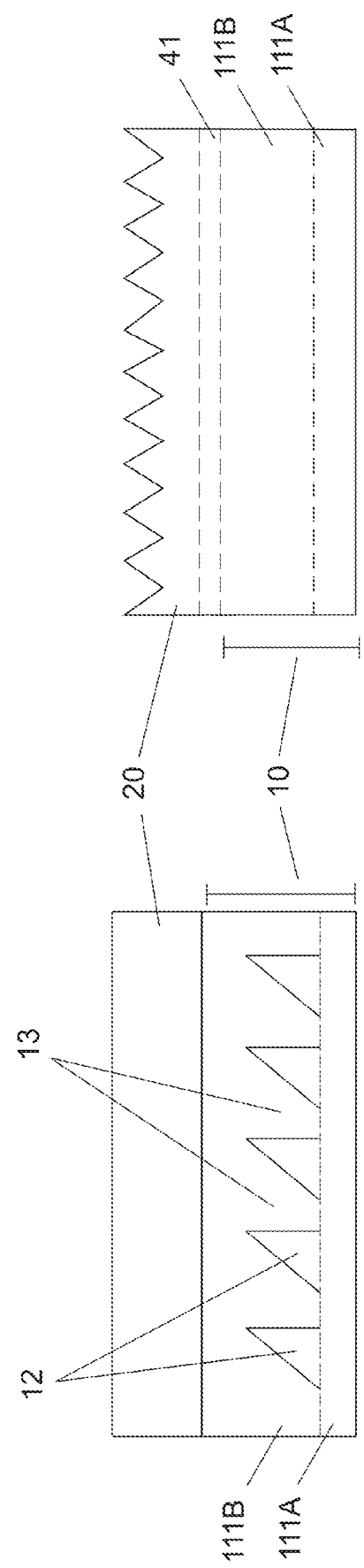
FIG. 3 illustrates an exemplary embodiment of a light distribution element comprising a light extraction film with an air-cavity pattern and the same with an open top pattern.

With reference to FIG. 3, the light distribution element 100 can further comprise a third functional layer 20. In such an event, functionality attained by the second functional layer 10 provided as the extraction and light outcoupling layer can be combined with the functionality attained by said third functional layer. The third functional layer 20 can be provided as a conventional prismatic layer structure, as a hard protective coating, as an antireflective and anti-glare coating, a self-cleaning coating and the like.

A dual-type structure can thus be established with the air-cavity pattern (layer 10) and an open top pattern (layer 20). This opens a possibility to control light outcoupling distribution and other performances. For example, when the third functional layer 20 is configured as a prism type layer or a lenticular layer with the open pattern is utilized as a top layer, such solution can provide a bidirectional light distribution.

The light distribution element 100 can be thus configured as a multi-layer film that exploit both an air-cavity pattern (within the light extraction/second functional layer 10), and an open top pattern (e.g. prismatic pattern within the third functional layer 20). Additionally, a diffuser can be optionally integrated between mentioned optical pattern layers.

The light distribution element further comprises a light source 7, selected from: a Light Emitting Diode (LED), an Organic Light Emitting Diode (OLED), a laser diode, a LED bar, an OLED strip, a microchip LED strip, and a cold cathode tube.

In another aspect, an optical device 200 is provided, comprising the light distribution element according to any of the embodiments described herein above.

The optical device can be configured as a frontlight illumination device or a backlight illumination device.

Figure 4:
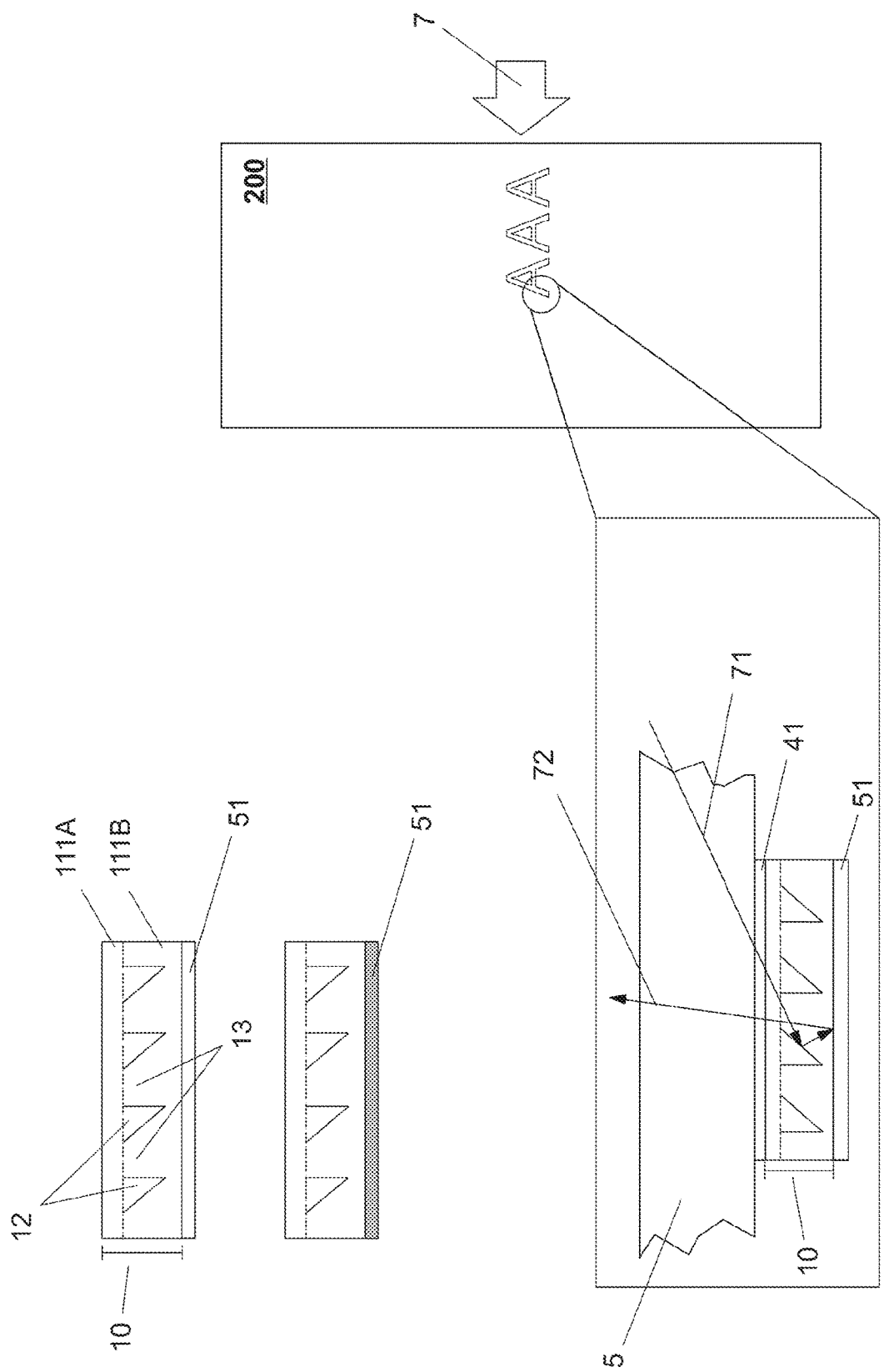
FIG. 4 schematically illustrates the light distribution element 100 integrated into an advertisement illumination concept for windows, for example.

FIG. 4 thus demonstrates the light distribution element, according to some aspect, integrated into a signage and/or -advertisement illumination concept for a night-time luminaire. The advertisement film shown in FIG. 4 can provided, by cutting for example, to adopt any shape, and it can be adhered onto a window or a screen. The solution comprises the light source 7 (the LED), arranged at the edge of the optical device 200. The solution shown on FIG. 4 can further comprise a reflector sheet 51 of a predetermined color.

The optical device 200 can be configured as a window, a façade illumination and/or indication element, a roof illumination and/or indication element, a signage, a signboard, a poster, a marketing board, an advertisement board illumination and/or indication element, and an illumination element configured for solar applications.

Hence, in an aspect, use of the optical device 200, according to one of the previous aspects is further provided in illumination and indication, selected from the group consisting of: decorative illumination, light shields and masks, public and general illumination, including window, façade and roof illumination, signage-, signboard-, poster- and/or an advertisement board illumination and indication, and in solar applications.

Figure 5:
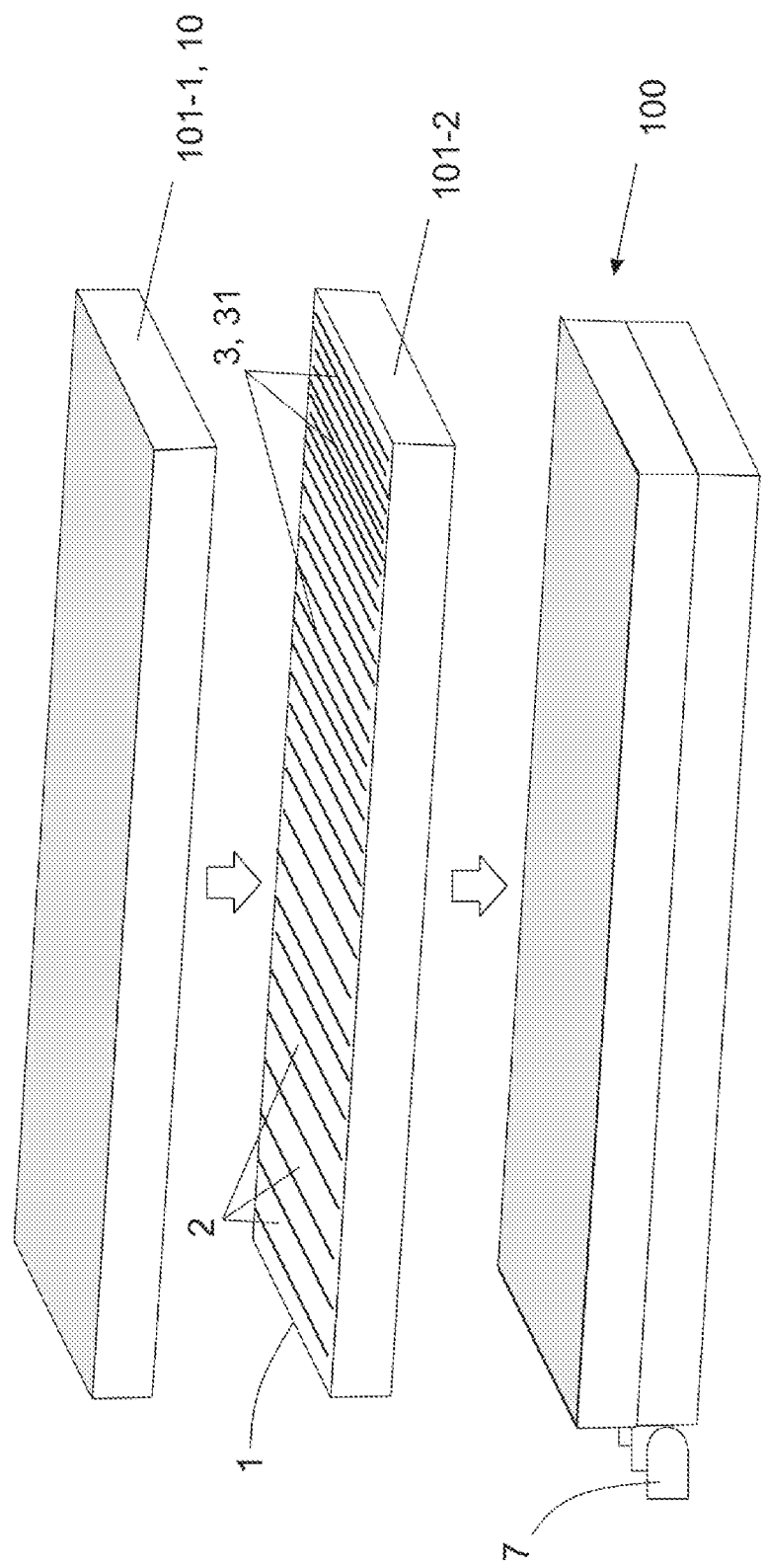
FIG. 5 is a perspective view of the element 100, according to an exemplary embodiment.

FIG. 5 is further illustrative of a general concept for assembling a layered structure for the light distribution element 100. The element 100 shown on FIG. 5 thus comprises an upper medium 101-1 (e.g. consisting of or comprising the layer 10 with an optical extraction pattern, such as cavity optics, for example), and a bottom medium 101-2 overlaid with the optical filter 1 (with optical adhesive patterns, continuous lines with density variation). The upper and the bottom media are laminated together. Thus, a laminated lightguide with embedded light filtering/controlled light passing from the bottom to upper medium can be established.

Figure 7A:
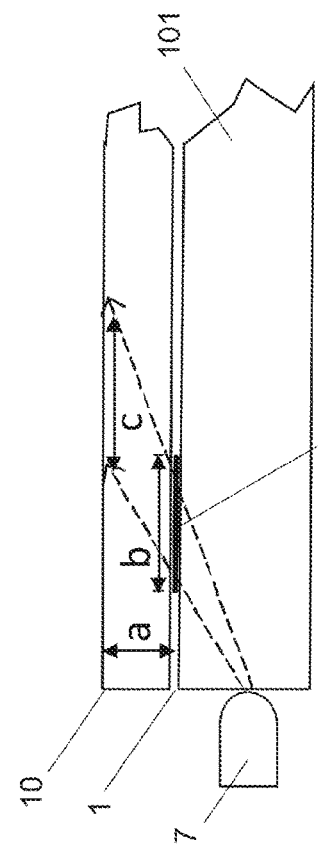
FIGS. 7A and 7B schematically illustrate the effect of structural variations within the light distribution element 100 on light propagation and the size of local illumination area.
Figure 7B:
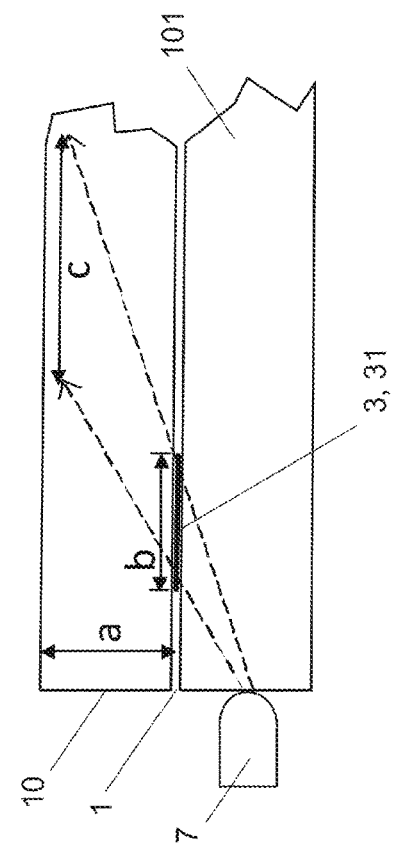

FIGS. 7A and 7B are further illustrative of how the thickness of second medium (a) controls light propagation and maximum size of local illumination area (c) together with size and format of optical adhesion contact (b). Light control, such as uniformity can be defined by ratio of multiple adhesion contacts (b) and height of second medium (a). FIGS. 7A and 7B thus show the impact of medium thickness (b) for illumination area (c), which is increasing with larger medium thickness.

FIGS. 7A and 7B illustrate a fundamental functional of the optical contact 31 with regard to the illumination area. The relationship between the lateral size (b) of the optical contact and the lateral illumination projection (c) is directly related to the thickness of second medium (the layer 10). Final size of the optical contact can be defined for a preferred illumination target, in accordance with equation (2):

$$\frac{c}{b} \propto a \quad (2)$$

This is simplified solution that does not take into account any $R_i$ values and Snell's law, and it can be utilized quickly to design a desired illumination area, total uniformity, discrete illumination, such as images, marking, etc.

As mentioned hereinabove, the optical contact, implemented as both 21, 31 does not form a real optical structure configured to manage light, to control light direction, etc. The optical contact(s) 21, 31 is/are merely contact areas that enable light propagation form the first medium (e.g. lightguide medium 101) to the second medium (e.g. the light extraction layer 10).

A ratio between vertical and lateral values has to be controlled in order to achieve a minimum ratio of 1/4 (vertical/lateral). Lateral value for the mentioned ratio is unlimited (in theory, said value can reach infinity), therefore, the ratios of 1/8, 1/20, 1/100, etc., are possible. Typical vertical dimensions (thicknesses) are provided within a range of 0.5-100 μm.

In an aspect, a roll of a light distribution element is further provided, comprising: a first functional layer 1 configured as an optical filter layer, and a second functional layer 10 comprising an at least one optically functional pattern 11, wherein the first functional layer 1 is rendered with a light uniformity control function.

In said roll of the light distribution element, the first functional layer 1 can be established by a structure implemented according to any configuration described hereinabove.

It is clear to a person skilled in the art that with the advancement of technology the basic ideas of the present invention are intended to cover various modifications thereof. The invention and its embodiments are thus not limited to the examples described above; instead they may generally vary within the scope of the appended claims.

The invention claimed is:

1. A light distribution element comprising:
a lightguide medium configured for light propagation,
a first functional layer configured as an optical filter layer and disposed on an at least one surface of the lightguide medium, and
a second functional layer comprising an at least one optically functional feature pattern,
wherein the first functional layer and the second functional layer are rendered with an at least one optical function related to light incident at an angle equal and/or below the critical angle,
wherein the first functional layer is further configured as an internal layer with a light uniformity control function, and wherein the first functional layer comprises a number of optical contact areas configured to transmit light rays therethrough to the second functional layer and from the second functional layer,
wherein the optical contact areas are established in the first functional layer by a number of apertures formed in a substrate material, and
wherein the apertures are through-apertures penetrating through opposing surfaces of the substrate material.

2. The light distribution element of claim 1, wherein the first functional layer is integrated between the second functional layer and the lightguide medium.

3. The light distribution element of claim 1, wherein the first functional layer is a cladding, a coating, or a film.

4. The light distribution element of claim 1, wherein the first functional layer is rendered with at least a light transmission function.

5. The light distribution element of claim 1, wherein the first functional layer is at least partly formed of a substrate material wherein the substrate material has a refractive index substantially equal to or higher than a refractive index of the material constituting the lightguide medium and, a refractive index of material constituting the second functional layer.

6. The light distribution element of claim 1, wherein the first functional layer is at least partly formed of a substrate material, wherein the substrate material has a refractive index lower than a refractive index of material constituting the second functional layer and, lower than a refractive index of material constituting the lightguide medium.

7. The light distribution element of claim 1, wherein the first functional layer is configured as a total internal reflection (TIR) layer structure.

8. The light distribution element of claim 1, wherein the number of apertures are integrated into a layer of optically transparent material.

9. The light distribution element of claim 8, wherein the optically transparent material is an adhesive material.

10. The light distribution element of claim 1, wherein the optical contact areas are established in the first functional layer by a discrete pattern or patterns formed by the substrate material between the apertures.

11. The light distribution element of claim 10, wherein the apertures form enclosed voids, upon being integrated within the light distribution element.

12. The light distribution element of claim 10, wherein the enclosed voids are filled with gaseous medium, such as air, or with vacuum.

13. The light distribution element of claim 1, wherein the optical contact areas are provided as any one of: a line, a dot, a geometric shape, a cross, a grid, or as a pattern comprising any combination thereof.

14. The light distribution element of claim 1, wherein the optical contact areas are arranged into an at least one array within an at least one predetermined location at the first functional layer or into an at least one array extending along and/or across an entire surface of the first functional layer.

15. The light distribution element of claim 1, wherein the first functional layer comprises at least two sublayers.

16. The light distribution element of claim 15, wherein each sublayer comprises a number of optical contacts, configured to transmit light rays therethrough, wherein the optical contacts are formed by a plurality of apertures and/or by a discrete pattern or patterns formed by the substrate material between the apertures.

17. The light distribution element of claim 1, wherein the lightguide medium further comprises a number of prominent, optically functional relief profiles, integrated with the adhesive material.

18. The light distribution element of claim 1, wherein the second functional layer is configured as an optically functional layer rendered with at least a light extraction function and a light outcoupling function.

19. The light distribution element of claim 1, wherein the at least one optically functional feature pattern of the second functional layer is formed in a light-transmitting carrier medium by a plurality of features provided as optically functional cavities.

20. The light distribution element of claim 1, wherein, in the at least one optically functional feature pattern, the optically functional cavities are open-top features.

21. The light distribution element of claim 1, wherein the at least one optically functional feature pattern of the second functional layer is fully integrated and/or embedded within a light-transmitting carrier medium, whereby an embedded feature pattern is established in the light-transmitting carrier medium by a laminate structure formed by an entirely flat, planar layer of the light-transmitting carrier medium arranged against a patterned layer of the light-transmitting carrier medium and a plurality of optically functional internal cavities is formed at an interface between the planar layer of the light-transmitting carrier medium and the patterned layer.

22. The light distribution element of claim 1, wherein the optical function or functions of the second functional layer is/are established by an at least one of the: dimensions, shape, periodicity and disposition of cavities within the at least one optically functional feature pattern.

23. The light distribution element of claim 1, wherein the cavities are filled with gaseous medium, such as air.

24. The light distribution element of claim 1, wherein the at least one optically functional feature pattern comprises a plurality of discrete feature profiles.

25. The light distribution element of claim 1, wherein the at least one optically functional feature pattern comprises a plurality of at least partly continuous feature profiles provided as a symmetric pattern structure or as an asymmetric pattern structure.

26. The light distribution element of claim 1, wherein the at least one optically functional feature pattern is a hybrid pattern comprising a plurality of discrete feature profiles or a plurality of at least partly continuous feature profiles.

27. The light distribution element of claim 1, wherein cavities are provided with the at least one optically functional feature pattern and are selected from the group consisting of: a groove, a recess, a dot, and a pixel, wherein the cavities have crosswise profiles selected from: binary-, blazed-, slanted-, prism-, trapezoid-, and hemispherical profiles, and wherein cavities have a lengthwise shape selected from: linear, curved, waved, and sinusoid.

28. The light distribution element of claim 1, wherein the lightguide medium and the second functional layer are an optical polymer and/or glass.

29. The light distribution element of claim 1, wherein the second functional layer is provided in the form of a laminated multilayer structure comprising an at least one layer with integrated cavity features and/or a third functional layer, configured as an open profile layer.

30. The light distribution element of claim 1, further comprising at least one light source, selected from: a Light Emitting Diode (LED), an Organic Light Emitting Diode (OLED), a laser diode, a LED bar, an OLED strip, a microchip LED strip, and a cold cathode tube.

31. The light distribution element of claim 1, configured as a light guide, a light pipe, a light-guide film or a light-guide plate.

32. An optical device comprising the light distribution element according to claim 1.

33. The optical device according to claim 32, configured as a frontlight illumination device or a backlight illumination device.

34. Use of the optical device as defined in claim 32, in illumination and indication, selected from the group consisting: of decorative illumination, light shields and masks, public and general illumination, including window, facade and roof illumination, signage-, signboard-, poster- and/or an advertisement board illumination and indication, and in solar applications.

35. A roll of a light distribution element comprising:
a first functional layer configured as an optical filter layer, and
a second functional layer comprising an at least one optically functional pattern, wherein the first functional layer is rendered with a light uniformity control function,
in which the first functional layer is established by the structure, as defined in claim 1.

36. The light distribution element of claim 20, wherein the first functional layer comprises non-enclosed voids, and the non-enclosed voids connect to the open-top features.

37. A light distribution element comprising:
a lightguide medium configured for light propagation,
a first functional layer configured as an optical filter layer and disposed on an at least one surface of the lightguide medium, and
a second functional layer comprising an at least one optically functional feature pattern,
wherein the first functional layer and the second functional layer are rendered with an at least one optical function related to light incident at an angle equal and/or below the critical angle,
wherein the first functional layer is further configured as an internal layer with a light uniformity control function, and wherein the first functional layer comprises a number of optical contact areas configured to transmit light rays therethrough to the second functional layer and from the second functional layer,
wherein, in the at least one optically functional feature pattern, the optically functional cavities are open-top features, and
the first functional layer comprises non-enclosed voids, and the non-enclosed voids directly connect to the open-top features.

* * * * *